INVENTORS
H. H. MERWIN
D. V. WATERS
BY
W.C. Parnell
ATTORNEY

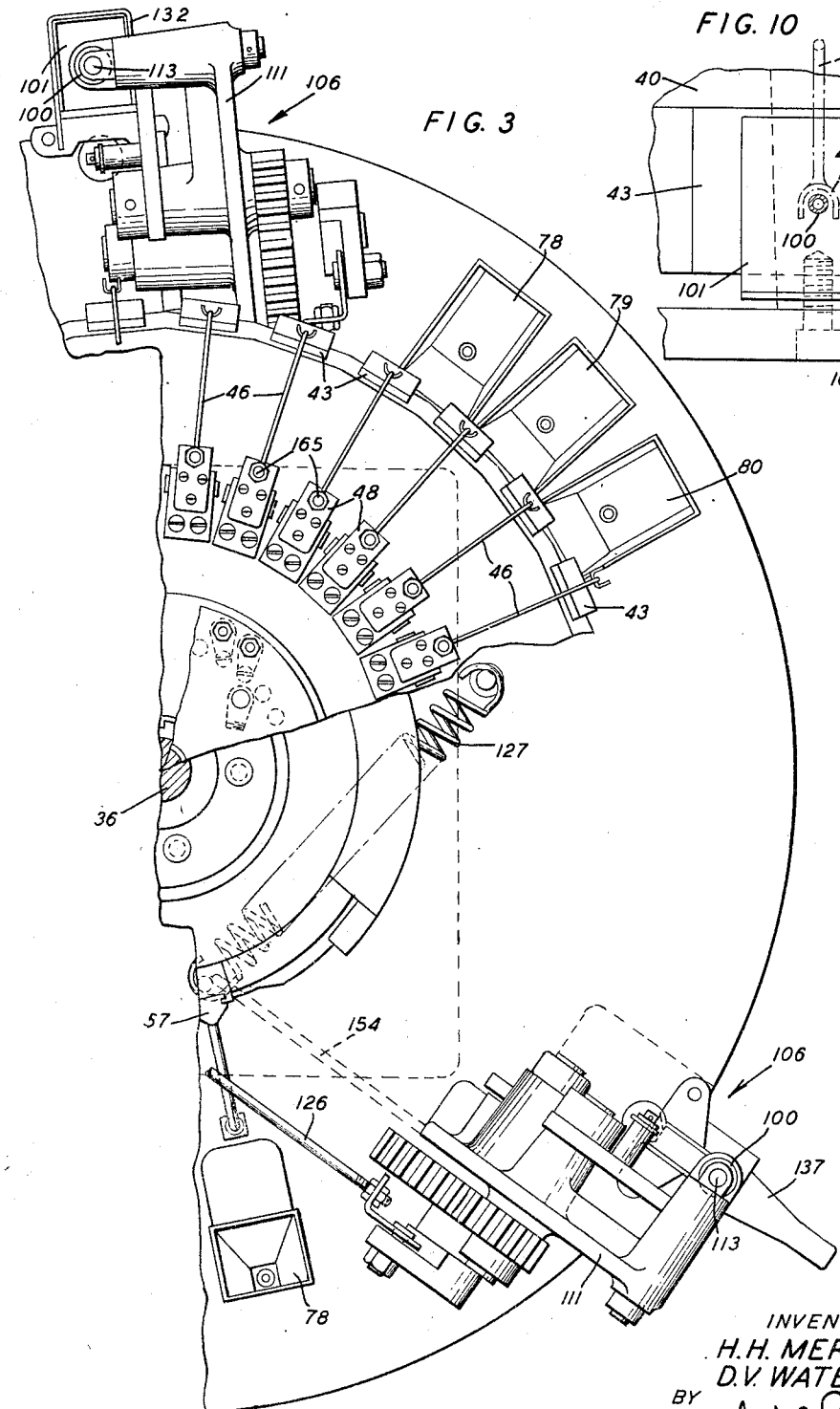
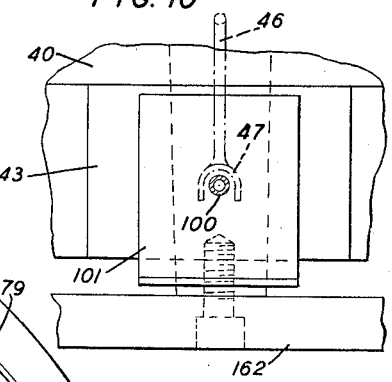

March 27, 1951  H. H. MERWIN ET AL  2,546,314
ARTICLE HANDLING AND SORTING APPARATUS
Filed April 2, 1946  6 Sheets-Sheet 4

INVENTORS
H. H. MERWIN
D. V. WATERS
BY
ATTORNEY

March 27, 1951 H. H. MERWIN ET AL 2,546,314
ARTICLE HANDLING AND SORTING APPARATUS
Filed April 2, 1946 6 Sheets-Sheet 5

INVENTORS
H.H. MERWIN
D.V. WATERS
BY W.C. Parnell
ATTORNEY

March 27, 1951     H. H. MERWIN ET AL     2,546,314
ARTICLE HANDLING AND SORTING APPARATUS Filed April 2, 1946     6 Sheets-Sheet 6

INVENTORS
H. H. MERWIN
D. V. WATERS
BY
W. C. Parnell
ATTORNEY

Patented Mar. 27, 1951

2,546,314

UNITED STATES PATENT OFFICE 2,546,314

ARTICLE HANDLING AND SORTING APPARATUS

Harry H. Merwin, Rutherford, and Daniel Vaughn Waters, Flemington, N. J., assignors to Western Electric Company, Incorporated, New York, N. Y., a corporation of New York Application April 2, 1946, Serial No. 659,018

2 Claims. (Cl. 209—81)

This invention relates to article handling and sorting apparatus, and more particularly to apparatus for handling and sorting metal coated mica plates for use in the manufacture of mica condensers.

In the manufacture of mica condensers, plates or thin strippings of mica, blanked the required size, and coated with a desired metal such as silver, are subjected to certain tests; first, to determine if they are porous, that is, whether or not they have defective holes therein; second, to determine their "Q" value, and finally, to sort them accordingly.

An object of the invention is to provide an apparatus which is simple in structure and highly efficient in operation for sorting articles according to conditions resulting from tests.

With this and other objects in view, the sorting apparatus comprises a container for a supply of articles disposed adjacent a loading position and a movable carriage having spaced terminals and interconnected mechanisms for intermittently moving the carriage. In its intermittent motion, the carriage positions the terminals successively to receive articles from the supply, actuates contact fingers for holding the articles against the terminals while being tested and then releases the fingers to drop each article into one of a plurality of receptacles selectively according to the result of the tests to which it has been subjected.

In one embodiment, the carriage is provided with terminals in spaced positions adjacent its periphery and a cam controlled transfer element feeds the articles one at a time from a supply hopper to the terminal at the loading position. The contact fingers are also cam controlled in timed relation to the transfer operation, to hold the article on its terminal during the intermittent rotation of the table. The terminals and their respective contact fingers are included in circuits during subsequent cycles of operation of the apparatus to subject the articles, which in the present embodiment are mica plates, to certain tests to determine first the presence of any structural defects, and if no defects are present, to subsequently test the articles or mica plates to determine their electrical characteristics. As a result of these tests, a solenoid may be operated to position a cam to actuate the contact fingers to free one of the articles at one location if it is defective, another solenoid being operable to cause a cam to free the article at another position, should the electrical characteristics of the article be below a given quality, and a fixed cam operating the contact finger at a final position if the article proves satisfactory, hoppers being provided for the articles at all of these positions.

Other objects and advantages will be apparent from the following detailed description when considered in conjunction with the accompanying drawings, wherein Fig. 1 is a fragmentary front elevational view of the apparatus;

Fig. 3 is a fragmentary top plan view of the remaining or right half of the apparatus;

Fig. 10 is an enlarged fragmentary sectional view taken along the line 10—10 of Fig. 4.

Figure 1:
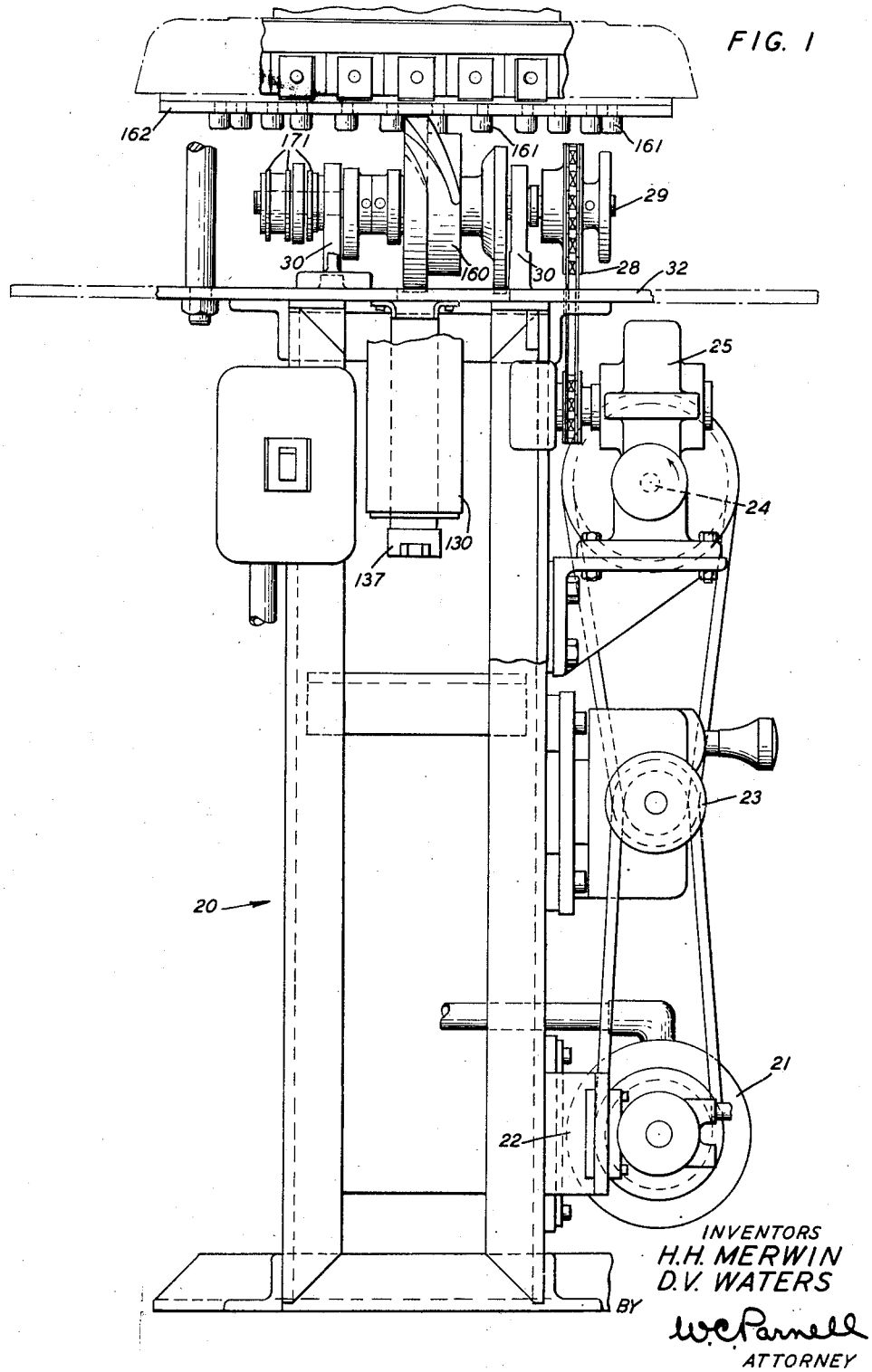
Figure 4:
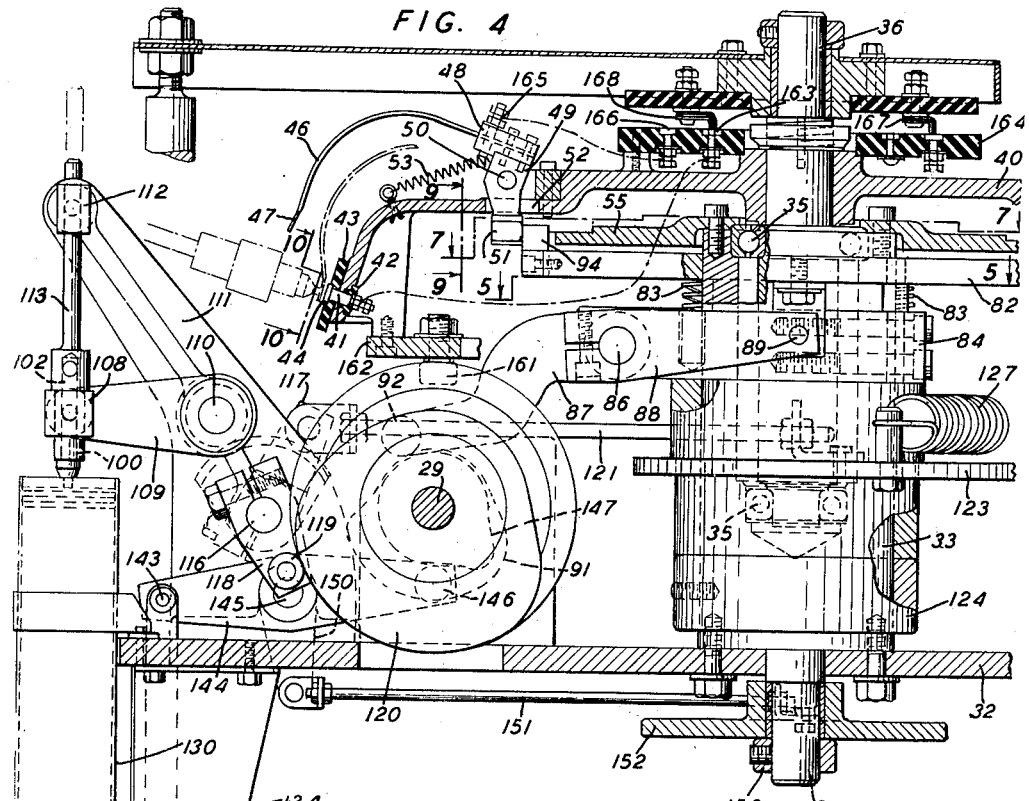
Fig. 4 is a fragmentary vertical sectional view of the apparatus.

Referring now to the drawings, attention is first directed to Fig. 1 which illustrates a vertical frame 20 having a motor 21 mounted at 22 upon the side of the frame. A variable speed pulley unit 23 is driven by the motor 21, which in turn, drives an input shaft 24 of a worm gear reducing unit 25. The output shaft of the unit 25 has a chain and sprocket connection 28 with a cam shaft 29. Bearing brackets 30 for the cam shaft 29 is mounted upon a supporting plate 32, which in turn, is mounted upon the frame 20. The supporting plate also has a vertical stationary shank 33 mounted thereon as shown in Fig. 4, the shank having a reduced portion 34 extending through an aperture in the support 32. The shank 33 is hollow and open at its upper end to support bearings 35 for a shaft 36. A table 40 is fixedly mounted upon the shaft 36 and is of the cross-sectional contour shown in Fig. 4. Only one side portion of the table is shown in this figure, but it is of the same formation throughout its circular contour providing an apron portion at its periphery for concealing various portions of the apparatus positioned therebeneath. The table carries a plurality of terminals 41 mounted at spaced positions on the apron portion and insulated therefrom by inner members 42 and outer members 43. The outer members 43 are recessed to partially receive the heads 44 of their respective terminals.

Figures 2, 9:
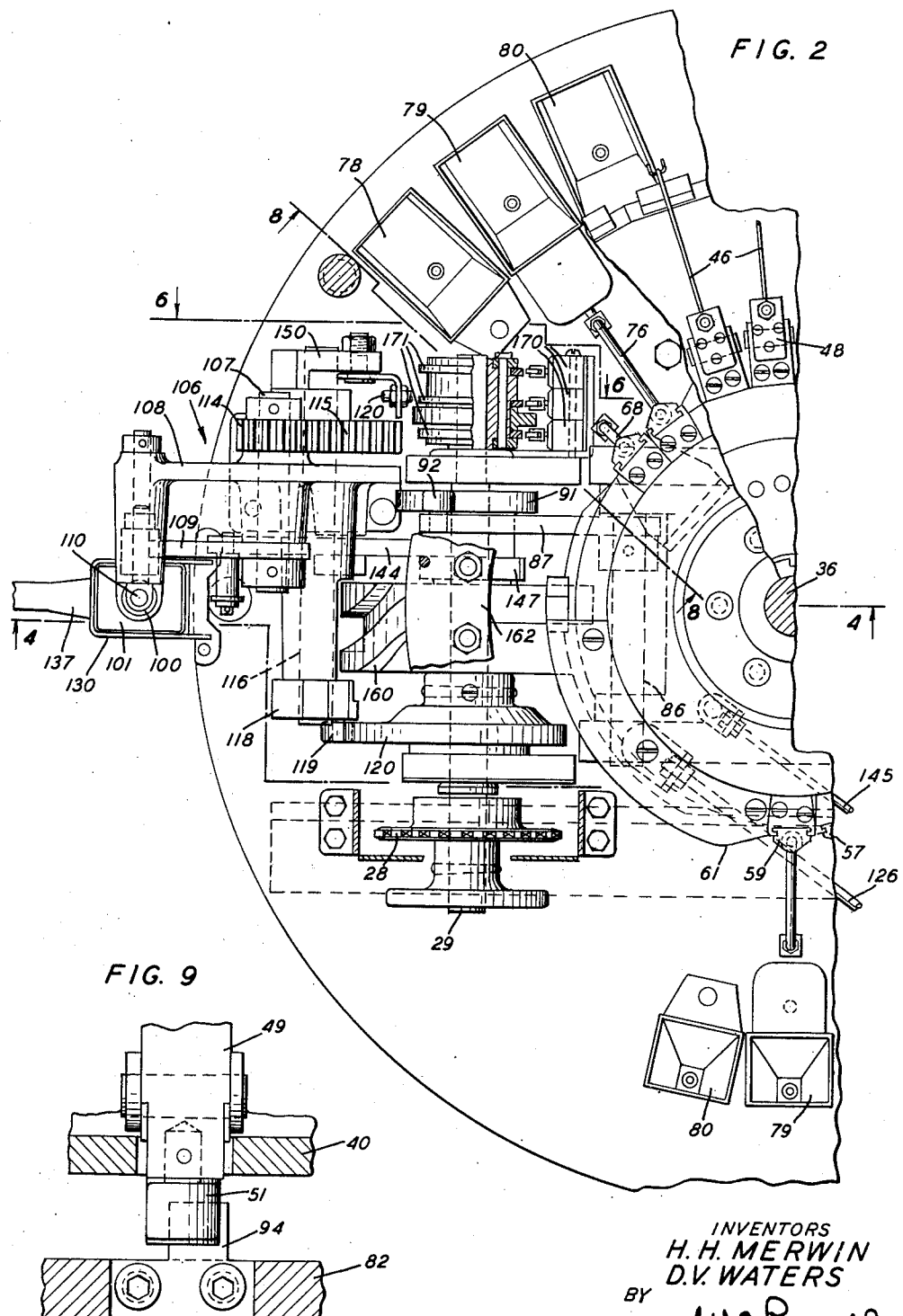
Fig. 2 is a fragmentary top plan view of the apparatus showing approximately the left half thereof.
Fig. 9 is an enlarged fragmentary sectional view taken along the line 9—9 of Fig. 4.

Contact fingers 46 of the general contour shown in Fig. 4 have forked outer ends 47 (Fig. 10), their inner ends being secured by clamps 48 on cam levers 49. As illustrated in Figs. 2 and 3, there is a contact finger 46 for each terminal, the levers 49 being disposed in circular arrangement about the table and their fingers extending radially toward their respective terminals. The levers 49 are supported by pivots 50 on the table and carry cam rollers 51 on their lower ends which extend through apertures 52 in the table. An individual spring 53 for each cam lever 49 provides a force to move its finger toward its terminal to hold an article, such as mica plates on the terminal. Through the force of the springs 53, the cam rollers 51 are normally urged inwardly so that they may be contacted by various cams hereinafter described.

A cam supporting element 55 (Figs. 4 and 7) is centrally apertured for the shaft 36 and an adjacent hub portion of the table 40, and is rigidly mounted upon the upper end of the hollow shank 33 (Fig. 4).

In the present embodiment of the invention, the apparatus performs three identical groups of operations in feeding, testing and sorting mica plates. For this reason, there are three groups of cams carried by the cam element 55. One set of cams 57 (Figs. 7 and 8) is supported in guideways 58 for vertical movement into and out of operating positions to cause ejection of articles or mica plates which are porous. Another group of cams 59 identical in structure to the cams 57 and mounted in similar guideways 60 are movable vertically into and out of operating position to eject the mica plates which are not physically defective, but which fail to have the necessary electrical characteristics. Next to the cams 59 in a clockwise direction, fixed cams 61 are mounted upon the element 55 to cause actuation of the fingers 46 to eject the mica plates which have passed the tests.

Figure 8:
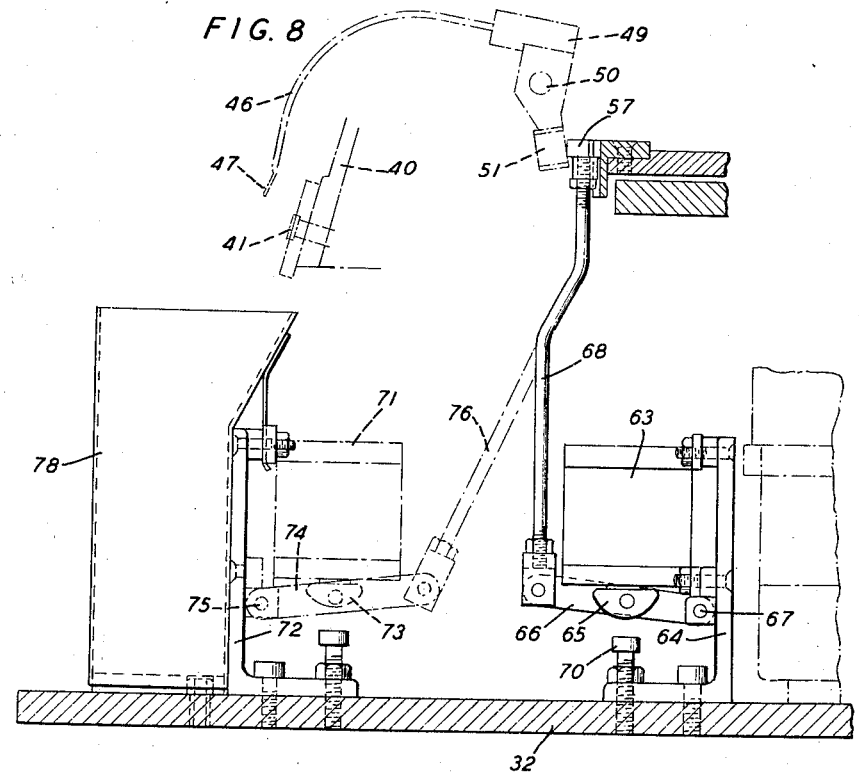
Fig. 8 is a fragmentary sectional view taken substantially along the line 8—8 of Fig. 2.

The cams 57 are normally in their lower positions out of possible engagement with the cam rollers 51 but they are moved vertically into the path of the cam rollers as shown in Fig. 8 through the energization of their solenoid 63. There are three solenoids 63, one for each of the cams 57, but the illustration of one is believed sufficient for all three. The solenoid 63 shown in Fig. 8 is supported by a bracket 64 mounted upon the support 32. The core 65 of the solenoid is pivotally connected to a lever 66, pivoted at 67 to the bracket 64, its outer end being connected to a rod 68 which supports its respective cam 57. The cam 57 with the rod 68, lever 66 and core 65 will drop downwardly by gravity, to a stop 70, positioning the cam out of the path of the roller 51, energization of the solenoid moving its associated mechanism with the cam to the position shown in Fig. 8. A similar mechanism is provided for each of the cams 59 including a solenoid 71 mounted upon a bracket 72 and having its core 73 pivotally connected to a lever 74. The lever 74 is pivotally supported at one end at 75, its other end being pivotally connected to a rod 76 which supports its respective cam 59 on the upper end thereof.

There are three groups of receptacles for the three groups of cams, each group including a receptacle 78 for receiving the materially defective mica plates, a receptacle 79 for receiving the mica plates passing the first test, but of insufficient electrical characteristics and a receptacle 80 to receive the mica plates which have passed the tests. These receptacles are disposed adjacent the table to receive the mica plates as they are released from between the fingers 46 and contacts 41.

Figure 5:
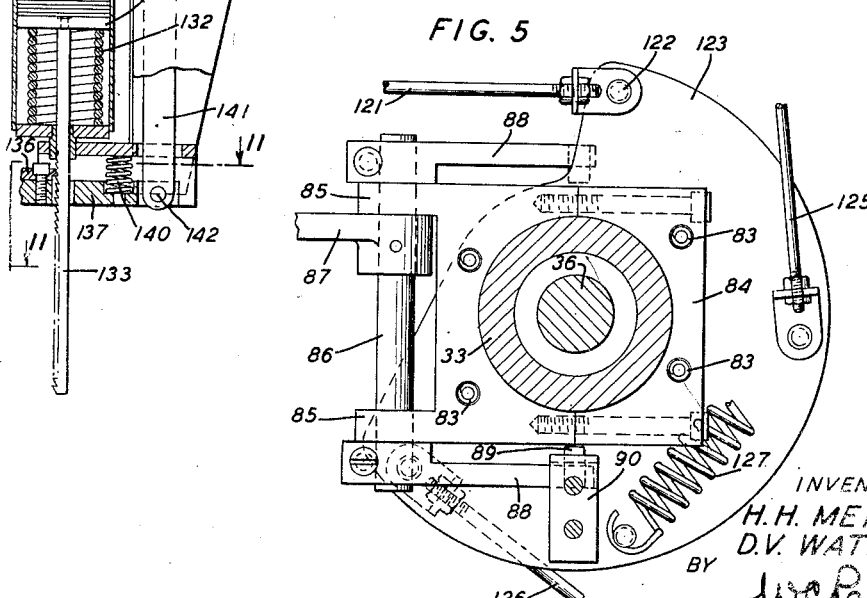
Fig. 5 is a fragmentary sectional view taken along the line 5—5 of Fig. 4.
Figure 7:
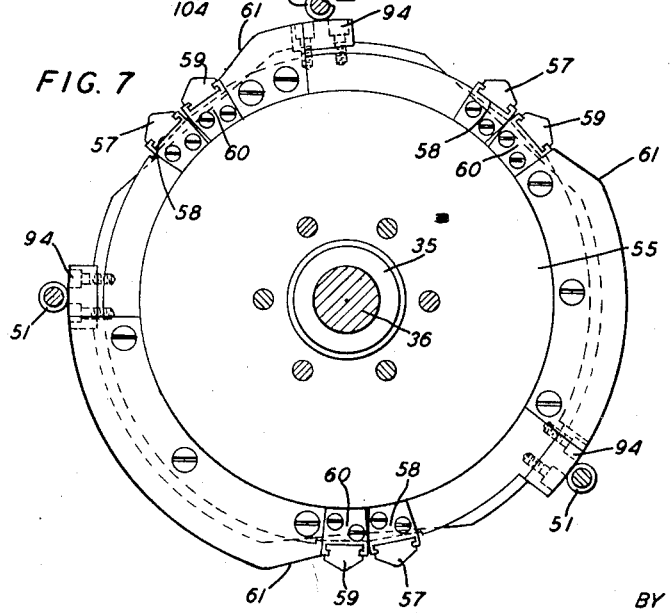
Fig. 7 is a fragmentary sectional view taken along the line 7—7 of Fig. 4.

A mechanism is provided at each one of the three operating positions to automatically feed the mica plates singly to the terminals at the loading positions and to cause operation of the contact fingers to have them positioned free of the terminals to receive the mica plates and to release the fingers so that they will be closed on the mica plates prior to the movement of the transfer mechanism away therefrom. The mechanism for operating the contact fingers 46 at these positions includes a control member 82 disposed concentric with the shank 33 and movable axially thereon. The control member 82 is supported by springs 83 carried by a collar 84 fixedly mounted on the shank 33. The collar 84 is of the general contour shown in Fig. 5, one portion thereof including bearings 85 for a shaft 86. The shaft 86 has a cam lever 87 mounted thereon intermediate its ends, the ends of the shaft supporting lifting levers 88. The outer ends of the levers 88 support pins 89 which extend inwardly through apertures in brackets 90 supported by the control member 82. A cam 91 mounted upon the shaft 29 cooperates with a cam roller 92 carried by the cam lever 87 to rock the shaft 86 to move the levers 88 (Fig. 4) clockwise to pull the control member 82 downwardly against the force of the springs 83. Holding blocks 94 mounted at spaced positions on the periphery of the control member 82, as illustrated in Fig. 7, normally extend upwardly to be engaged by the cam rollers 51 to hold their respective fingers outwardly as the cam rollers leave their respective cams 61. When the cam rollers 51 engage the blocks 94, their respective fingers 46 are in their loading positions.

At this time, a transfer or feeding mechanism is in operation at each one of the loading positions to transfer mica plates singly from supplies to their respective terminals. This feeding mechanism includes a transfer element 100 which is operated in timed relation with the movement of the table to transfer the leading article of a supply of articles (metal coated mica plates) 101 to a position on the contact 41 at each of the loading positions and to hold the article in place until the finger 46 at that position is freed by downward movement of the control member 82 and allowed to be forced against the article by its spring 53. The transfer element 100 is of a hollow plunger type structure with a central aperture 102 connected by suitable means, such as a hose 103 (Fig. 6) to a supply line 104 of a vacuum system through the operation of a valve 105. The valve 105 controls the vacuum supply for all three positions, but to illustrate the invention, only one feeding mechanism is shown in detail, all three mechanisms being illustrated in Figs. 2 and 3 combined and identified by reference numerals 106. A cam 107 mounted upon the shaft 29 operates the valve 105 into open position at a given time and allows the valve to close during operation of the feeding mechanisms. The transfer element 100 is supported in a swivel 108 supported by the outer end of a lever 109, the inner end of the lever being mounted upon a shaft 110, journalled in a suitable bearing of a bracket 111. The bracket 111 is mounted upon the support 32 and extends upwardly to provide a bearing for another swivel member 112. The member 112 is apertured to receive a guide rod 113 integral with the transfer element 100 to guide the element in its movement from the solid line position shown in Fig. 4 to the dot dash line position shown in this figure. A gear 114 (Fig. 6) is mounted upon the shaft 110 at the opposite side of the bracket 111 and interengages a gear segment 115 which is fixedly mounted upon a shaft 116. The shaft 116 is journalled in a suitable bearing in the bracket 111, one end of the shaft having a lever 117 mounted thereon. The opposite end of the shaft 116 carries a cam lever 118, the lower end of which carries a roller 119 engaging the periphery of a cam 120. The cam 120 is mounted upon the shaft 29 and is driven thereby so as to operate the feeding mechanisms in timed relation with the other operating means associated with the shaft 29.

Returning now to the lever 117 (Figs. 4, 5 and 6), the outer end of this lever is pivotally connected to a rod 121, the other end of the rod being pivotally connected at 122 to a control plate 123 which is mounted for rotation between the collar 84 and a fixed collar 124 on the spindle 33. Similar rods 125 and 126, pivotally mounted at spaced positions on the control plate 123 to simultaneously actuate the feeding mechanisms including the transfer elements of the other feeding units 109. As illustrated in Fig. 4, the high portion of the cam 120 functions to return the element 100 to the receiving position above the supply of articles or mica plates 101 and to hold the element in this position until it is time to feed another article to the terminal at the loading position. The low portion of the cam 120 renders the spring 127 effective to rotate the plate 123 about the shank 33 moving all of the rods 121, 125 and 126 toward their respective feeding units to rotate their shafts 116, rock their gear segments 115, rotate their sprockets 114 and shafts 110 to rotate their levers 109 clockwise (Fig. 4) and swing the transfer elements 100 from the receiving solid line position to the feeding dot dash line position.

Figure 11:
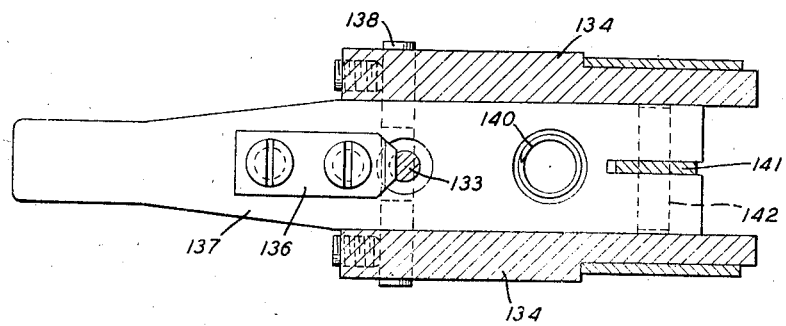
Fig. 11 is an enlarged sectional view taken along the line 11—11 of Fig. 4.

The stack of articles or mica plates 101 are disposed in a hopper 130 on a plunger 131 movable in the hopper under the force of a spring 132 controlled by a ratchet or toothed rod 133. The rod 133 extends through the bottom of the hopper and through a portion of a bracket 134 which supports the hopper and its associated mechanism. A pawl 136 (Figs. 4 and 11) carried by a lever 137, pivotally supported at 138 by side portions of the bracket 134, is formed to engage the teeth of the rod 133 and to intermittently release the rod to advance the supply of articles. The lever 137 is normally held downwardly to hold the pawl in engagement with the adjacent tooth of the rod 133 by a spring 140. The mechanism for actuating the lever 137 for each feeding operation includes a link 141 having its lower end pivotally connected at 142 to the lever 137, the upper end of the link being connected at 143 to a cam lever 144. The lever 144 is mounted upon a shaft 145 and carries a cam roller 146 which is under the control of a cam 147. The cam 147 is mounted upon a shaft 29 and is rotated therewith to cause operation of the feeding mechanism in timed relation with the other operating units of the apparatus. A lever 150 mounted on the shaft 145 has its free end connected to a rod 151 which connects the lever to a control disc 152. The disc 152 functions similarly to the control plate 123 and is mounted for rocking movement on the reduced portion 34 of the spindle 33, it being held in place by a collar 153. Other rods 154 (Figs. 2 and 3) are connected to the control disc 152 to operate the other feeding mechanisms of the units 106.

The mechanism for intermittently rotating the table 40 includes a barrel type cam 160 mounted upon the shaft 29 (Figs. 1 and 2) to operate in conjunction with a circular arrangement of cam rollers 161 carried by an annular member 162 supported by the table as illustrated in Fig. 4. There is one cam roller 161 and one controlling space between adjacent rollers, for each set of terminals 41 and contact fingers 46. The cam 160 moves the table the distance between the centers of the cam rollers 161 during each cycle of operation of the shaft 29 and holds the table against movement during the larger portion of each operating cycle of the apparatus.

Figure 6:
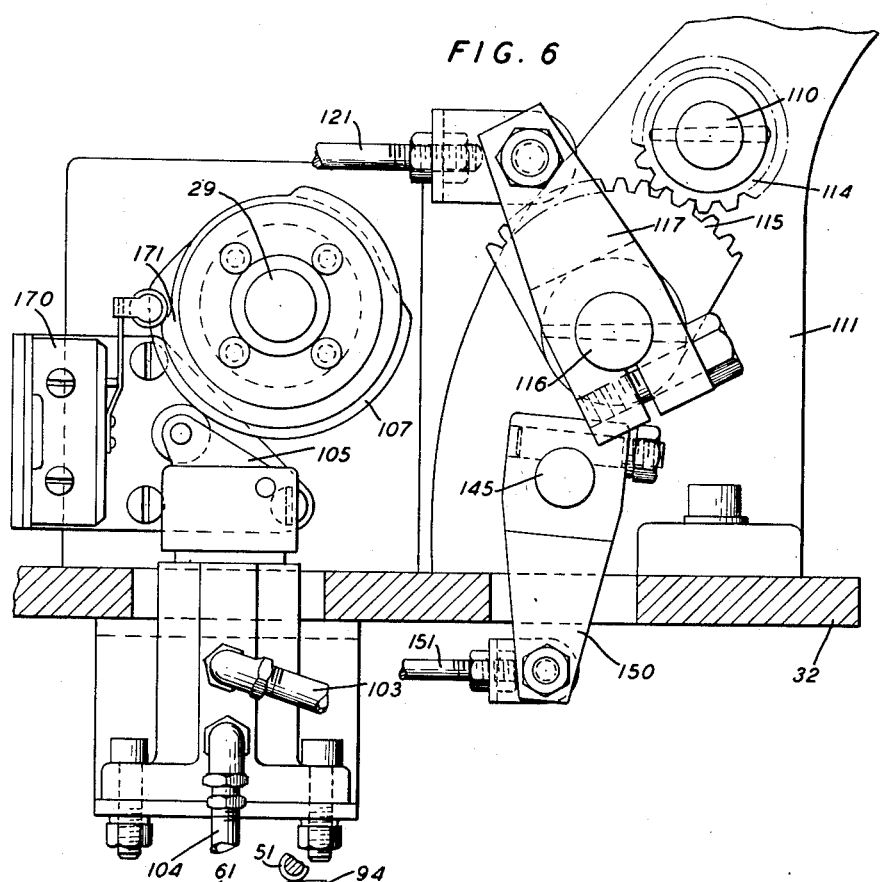
Fig. 6 is an enlarged fragmentary sectional view taken substantially along the line 6—6 of Fig. 2.

Since the present invention resides in the mechanical features of the feeding and sorting means and is not concerned with the details of the electrical tests made on articles sorted, the disclosure of the electrical testing equipment normally used with the apparatus has been limited to those portions necessary to an understanding of the present invention. The terminals 41 (Fig. 4) are each connected electrically to spaced contacts 163 of an annular insulating member 164 mounted for movement with the table 40. Terminal members 165 of each contact finger 46 are connected electrically to other contacts 166 of the insulating member 164. Through the aid of brushes 167 and 168, the companion groups of terminals 41 and contact fingers 46 may be included in test circuits under the control of micro switches 170 operated by cams 171 mounted on the shaft 29 (Figs. 2 and 6).

Upon considering the operation of the apparatus, only one feeding unit will be included in the description and one station on the table will be followed from the loading position through the tests to the ejecting positions. Referring now to Fig. 4, with the transfer element 100 in the receiving position and the leading article or mica plate 101 against the nose of the transfer element, the contact finger 46 at the loading position is held away from its terminal by the adjacent block 94 on the control element 82. The next action of apparatus at this station, when the shaft 29 has rotated sufficiently to move the high portion of the cam 120 beyond the roller 119, is to free the shaft 116 for rotation by the force of the spring 127. The force in this spring 127 will rotate the plate 123 about the spindle 33 a distance required to operate the transfer mechanism. This rotation or rocking movement of the plate 123 will move the rod 121 to the left (Fig. 4) or to the right (Fig. 6) rocking the shaft 116 with the lever 117 and gear segment 115 to rotate the pinion 114 and rock the shaft 110 a distance sufficient for the movement of the transfer element 100 from the receiving position to the feeding position.

Prior to the movement of the transfer element from the receiving position to the feeding position, the valve 105 has been operated by its cam 107 so that a vacuum or suction in the transfer element 100 will cause the element to pick up the leading article in the hopper 130 and transfer it to a position on the terminal 41 at the loading position. The transfer element remains in this position holding the article in place on the terminal until the high portion of the cam 91 rides beneath the roller 92 of the cam lever 87 to rock the cam lever and the shaft 86 and move the control member 82 downwardly to free the block 94 from the roller 51 allowing the spring 53 to move the contact finger 46 into engagement with the article. The forked end of the contact finger straddles the nose of the transfer element 100 to grip the article before it is released by the transfer element. At this point, valve 105 is closed to shut off vacuum line and vent the line so that the grip of transfer element 100 is broken. When the article is held on the terminal by its contact finger, the transfer element will return to its receiving position and at a given time interval thereafter, the cam 147 will actuate the lever 144 and link 141 to actuate the lever 137 and pawl 136 to free the rod 133 for upward movement the thickness of one article by the force of the spring 132. In this manner the supply of articles is advanced placing the next leading article in the receiving position with suitable force from the spring 132 to cause the leading article to close the nose of the element 100 after the previous leading article has been transferred to the table. In actual structure, the nose of the transfer element is movable axially, backed up by a spring (not shown) to allow for possible variation in the receiving position of the leading article 101 in the hopper 130. After the table is moved to the next position, this cycle of operation is repeated to feed another article to the terminal just moved into the loading position. However, the description will follow the article previously loaded onto the table. An electrical connection is made with each coated side of the article to include it in testing circuits completed during the next two intervals of operation of the apparatus. During the first interval of operation, an electrical test is made upon the article to determine whether or not it has any material defects such as holes or other open spots in the metallic coatings. During the next operating cycle of the apparatus, another test is completed on the article through the electrical connections of the terminal and contact finger carried up through the contacts 163 and 166 and their brushes 167 and 168.

The exact nature of these tests, as previously stated, is not of great importance, it being understood, however, that if the article fails to pass either test the solenoid 63 or 71 will function depending upon the condition of the article. If the article is defective, the solenoid 63 will be energized to move its cam 57 into a position so that during the next operating period of the apparatus, the contact finger holding the defective article will be moved outwardly as shown in Fig. 8, freeing the article so that it will drop into the receptacle 78. When this has been accomplished, the electrical circuit through the solenoid 63 is opened and the cam 57 resumes its normal position out of the path of the next roller 51 unless the next article proves to have similar defects.

The second electrical test upon the article may determine, for example, whether or not the electrical characteristics of the article are of a sufficient or satisfactory quality. If they are not, the solenoid 71 will be energized to move its cam 59 into the path of the roller 51 causing the finger 46 to free the low quality article to drop into the receptacle 79. All articles which pass the tests will move past the receptacles 78 and 79 and will be freed to drop into the receptacle 80 by the cam rollers 51 for the contact fingers engaging the cam 61.

With a single driving means in the motor 21 and a single group of controls mounted upon the common shaft 29, the various mechanisms for one section of the apparatus are operated in timed relation with each other, and by linking these controls with the controls of the other sections of the apparatus, they too will operate in timed relation with each other and with those of the main section. The apparatus is fully automatic in its operation, the only requirement for the operator being to fill the hopper 130 prior to starting the apparatus.

Although specific improvements of the invention have been shown and described, it will be understood that they are but illustrative and that various modifications may be made therein without departing from the scope and spirit of this invention as defined by the appended claims.

What is claimed is:

1. In an article sorting apparatus, a circular table having a downwardly projecting apron at its periphery, insulated electrical terminals disposed at spaced positions around the table on the apron, means to intermittently rotate the table about its axis to advance the terminals successively to a loading position, a magazine, for articles disposed in stacked formation therein, mounted with its open upper end at a given position relative to the table at the loading position, a support interposed between the magazine and the table, a transfer element having a hollow nozzle at one end connected to a suction means whereby the transfer element may successively remove the articles from the open end of the magazine and transfer them singly to the terminals when disposed at the loading position, a mechanism operable to move the transfer element through an operating cycle from a position where the nozzle thereof extends into the open end of the magazine to engage the topmost article, lift the article from the magazine, move the transfer element through an arc into alignment with the terminal at the loading position, force the article against the terminal and return to a position where the nozzle extends into the open end of the magazine to receive the next article, contact fingers for the terminals having forked ends to straddle the outer end of the nozzle to engage articles and hold them on their terminals at the loading position, and mechanism actuable to move the contact finger at the loading position into engagement with the article to firmly hold the article in engagement with the terminal at that position prior to the movement of the transfer element free of the article.

2. In an article sorting apparatus, a circular table having a downwardly projecting apron at its periphery, insulated electrical terminals disposed at spaced positions around the table on the apron, means to intermittently rotate the table about its axis to advance the terminals successively to a loading position, a magazine, for articles disposed in stacked formation therein, mounted with its open upper end at a given position relative to the table at the loading position, a support interposed between the magazine and the table, a transfer element having a hollow nozzle at one end connected to a suction means whereby the transfer element may successively remove the articles from the open end of the magazine and transfer them singly to the terminals when disposed at the loading position, a hollow member to slidably support the transfer element pivotally mounted on the support, an oscillating arm pivotally mounted at one position on the support and pivotally connected at another position to the transfer element, mechanism operable through successive cycles to move the transfer element from a position where the nozzle thereof extends into the open end of the magazine to engage the topmost article, lift the article from the magazine, move the transfer element through an arc into alignment with the terminal at the loading position, force the article against the terminal and return to a position where the nozzle of the transfer element extends into the open end of the magazine to receive the next article, contact fingers for the terminals having forked ends to straddle the outer end of the nozzle to engage articles and hold them on their terminals at the loading position, means normally urging the contact fingers to move their forked ends toward their terminals, a normally stationary cam positioned to move the contact fingers away from their terminals as they enter the loading position, and means to move the cam to free each contact finger at the loading position while the nozzle of the transfer element holds an article against the adjacent terminal to hold it on the terminal.

HARRY H. MERWIN.
DANIEL VAUGHN WATERS.

REFERENCES CITED

The following references are of record in the file of this patent:

UNITED STATES PATENTS

| Number | Name | Date |
|---|---|---|
| 1,984,031 | Purdy | Dec. 11, 1934 |
| 2,016,455 | Purdy | Oct. 8, 1935 |
| 2,159,987 | Hartman | May 30, 1939 |
| 2,350,511 | Lake | June 6, 1944 |